United States Patent
Yi et al.

(10) Patent No.: US 8,520,546 B2
(45) Date of Patent: Aug. 27, 2013

(54) APPARATUS AND METHOD FOR SETTING UP RADIO BEARER IN WIRELESS COMMUNICATION SYSTEM

(75) Inventors: Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 13/375,456

(22) PCT Filed: Jun. 23, 2010

(86) PCT No.: PCT/KR2010/004077
§ 371 (c)(1),
(2), (4) Date: Nov. 30, 2011

(87) PCT Pub. No.: WO2010/151047
PCT Pub. Date: Dec. 29, 2010

(65) Prior Publication Data
US 2012/0099461 A1    Apr. 26, 2012

Related U.S. Application Data

(60) Provisional application No. 61/220,189, filed on Jun. 24, 2009.

(30) Foreign Application Priority Data

Jun. 11, 2010    (KR) .................. 10-2010-0055190

(51) Int. Cl.
*H04L 1/00*    (2006.01)
*H04L 12/26*   (2006.01)
*H04W 4/00*    (2009.01)

(52) U.S. Cl.
USPC .......................................... 370/252; 370/329

(58) Field of Classification Search
USPC .......................................... 370/252, 328, 329
See application file for complete search history.

(56) References Cited

U.S. PATENT DOCUMENTS

| | | | |
|---|---|---|---|
| 6,215,765 B1 * | 4/2001 | McAllister et al. | 370/217 |
| 7,764,617 B2 * | 7/2010 | Cain et al. | 370/238 |
| 2002/0124106 A1 * | 9/2002 | Dolganow et al. | 709/242 |
| 2008/0305792 A1 | 12/2008 | Khetawat et al. | |
| 2009/0040966 A1 * | 2/2009 | Klatt et al. | 370/328 |

OTHER PUBLICATIONS

LG Electronics Inc., "Bearer Mapping in Relay Node," R2-092845, 3GPP TSG RAN2 #66, May 2009.
Qualcomm Europe, "Preference for Relay Operation in LTE-A," R2-092920, 3GPP TSG RAN WG2 #66, May 2009.

* cited by examiner

*Primary Examiner* — Ronald Abelson
(74) *Attorney, Agent, or Firm* — Lee, Hong, Degerman, Kang & Waimey

(57) ABSTRACT

An apparatus and method of setting up a radio bearer (RB) in a wireless communication system are provided. A relay node transmits information on a supported quality of service (QoS) to a core network (CN) or a user equipment. The relay node relays a service request of the user equipment to the CN and sets up a UuRB for a service requested by the service request over a Uu interface between the relay node and the user equipment under the instruction of the CN. The relay node sets up a UnRB over a Un interface between the relay node and a base station (BS) according to a required QoS for the service requested by the service request.

3 Claims, 8 Drawing Sheets

APPARATUS AND METHOD FOR SETTING UP RADIO BEARER IN WIRELESS COMMUNICATION SYSTEM

CROSS-REFERENCE TO RELATED APPLICATIONS

This application is the National Stage filing under 35 U.S.C. 371 of International Application No. PCT/KR2010/004077, filed on Jun. 23, 2010, which claims the benefit of earlier filing date and right of priority to Korean Patent Application Serial No. 10-2010-0055190, filed on Jun. 11, 2010, and also claims the benefit of U.S. Provisional Application Ser. No. 61/220,189, filed on Jun. 24, 2009, the contents of which are all hereby incorporated by reference herein in their entirety.

TECHNICAL FIELD

The present invention relates to wireless communications, and more particularly, to a method and apparatus for setting up a radio bearer (RB) in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

An LTE-A system employs new techniques such as carrier aggregation and a relay. The carrier aggregation is used to flexibly extend an available bandwidth. The relay is used to increase a cell coverage and support group mobility and to enable user-centered network deployment.

The relay provides two types of radio interfaces. One is a Uu interface between a relay and a user equipment, and the other is a Un interface between the relay and a base station. A radio bearer is set up in each radio interface. In order for the user equipment to receive a service from the base station via the relay, two radio bearers need to be set up.

Since a plurality of radio bearers are set up due to the introduction of the relay, the setting up of the radio bearers may be delayed. As a result, a service provided to a user equipment may be delayed. Therefore, there is a need for a method capable of effectively setting up the radio bearers.

DISCLOSURE OF INVENTION

Technical Problem

The present invention provides a method and apparatus for setting up a radio bearer RB) in a wireless communication system.

Solution to Problem

In an aspect, a method of setting up a radio bearer (RB) in a wireless communication system is provided. The method includes transmitting, by a relay node, information on a supported quality of service (QoS) to a core network (CN) or a user equipment, relaying, by the relay node, a service request of the user equipment to the CN, setting up a UuRB for a service requested by the service request over a Uu interface between the relay node and the user equipment under the instruction of the CN, and setting up a UnRB over a Un interface between the relay node and a base station (BS) according to a required QoS for the service requested by the service request.

The relay node may not accept the access of the user equipment to the relay node before transmitting the supported QoS to the CN or the user equipment.

The required QoS may be transmitted by the CN to the relay node.

The user equipment may determine whether the required QoS is supported by the relay node on the basis of information on the supported QoS, and thereafter, if the relay node supports the required QoS, transmits the service request.

The CN may determine whether the required QoS is supported by the relay node on the basis of information on the supported QoS, and thereafter, if the required QoS is supported by the relay node, instructs to set up the UuRB.

In another aspect, a method of setting up a radio bearer (RB) in a wireless communication system is provided. The method includes transmitting, by a user equipment, a service request to a core network (CN) via a relay node, receiving, by a user equipment, a modification request message from the CN to request modification of a quality of service (QoS) required by a service requested by the service request, and setting up a UuRB over a Uu interface between the relay node and the user equipment after transmitting a message for accepting the required QoS modification request to the CN.

In still another aspect, a method of setting up a radio bearer (RB) in a wireless communication system is provided. The method includes receiving, by a core network (CN), information on a quality of service (QoS) supported by the relay node from a relay node, receiving, by the CN, a service request from a user equipment via the relay node, determining, by the CN, whether the relay node supports a QoS required for a service requested by the service request on the basis of the information on the supported QoS, and if the relay node supports the required QoS, instructing the relay node to set up a UuRB over a Uu interface between the relay node and the user equipment.

In still another aspect, a method of setting up a radio bearer (RB) in a wireless communication system is provided. The method includes receiving, by a user equipment, information on a quality of service (QoS) supported by the relay node from a relay node, determining whether a required QoS is supported by the relay node on the basis of information on the supported QoS, if the relay node supports the required QoS, transmitting a service request for the required QoS, and setting up a UuRB for a service requested by the service request over a Uu interface between the relay node and the user equipment.

Advantageous Effects of Invention

Delay for setting up of a radio bearer (RB) can be prevented even if a relay is employed. A service delay is reduced, and the relay can reliably operate between a user equipment and a base station.

MODE FOR THE INVENTION

Figure 1:
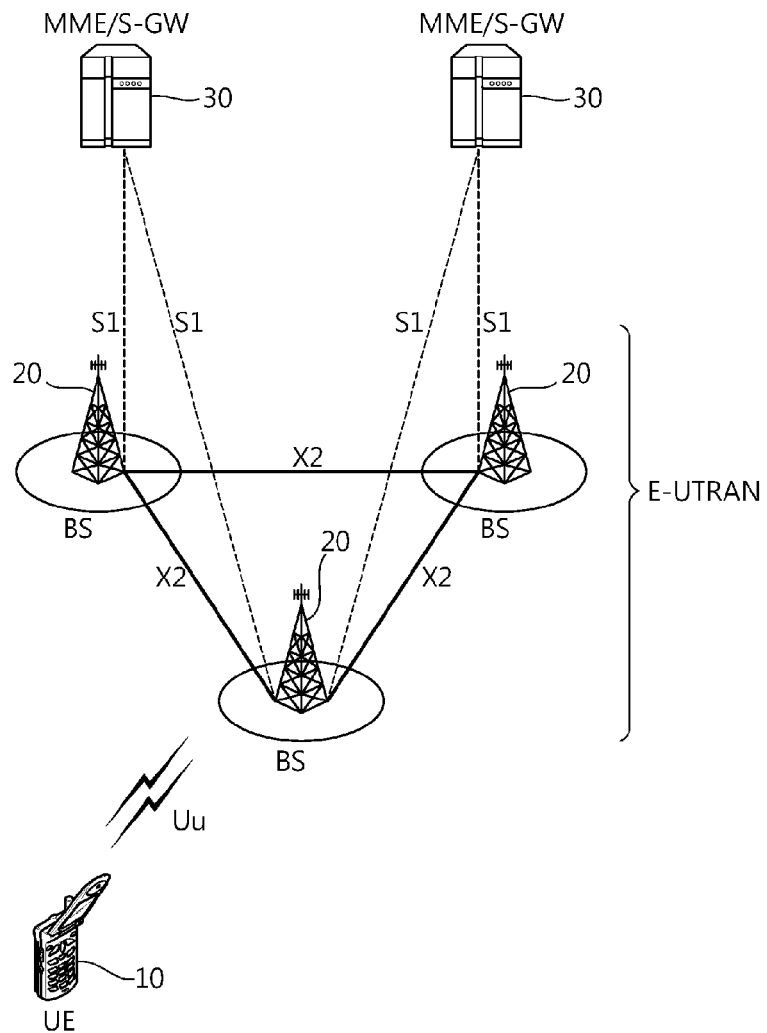
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is referred to as a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
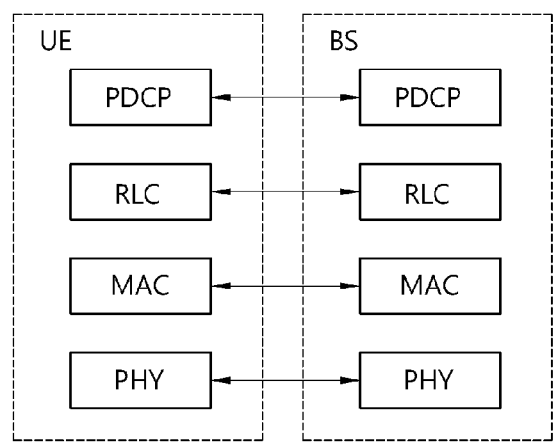
FIG. 2 is a diagram showing a radio protocol architecture for a user plane.
Figure 3:
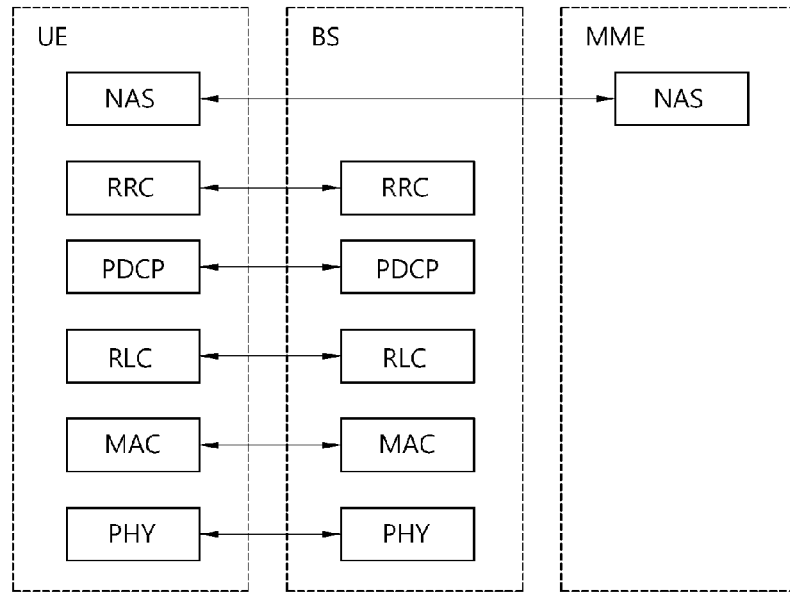
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A function of a packet data convergence protocol (PDCP) layer in the user plane includes user data delivery, header compression, and ciphering. A function of a PDCP layer in the control plane includes control-plane data delivery and ciphering/integrity protection.

A radio resource control (RRC) layer is defined only in the control plane. The RRC layer serves to control the logical channel, the transport channel, and the physical channel in association with configuration, reconfiguration and release of RBs.

An RB is a logical path provided by the first layer (i.e., PHY layer) and the second layer (i.e., MAC layer, RLC layer, and PDCP layer) for data delivery between the UE and the network. An RB setup procedure is a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

When an RRC connection exists between an RRC layer of the UE and an RRC layer of the network, the UE is in an RRC connected state, and otherwise the UE is in an RRC idle state.

Figure 4:
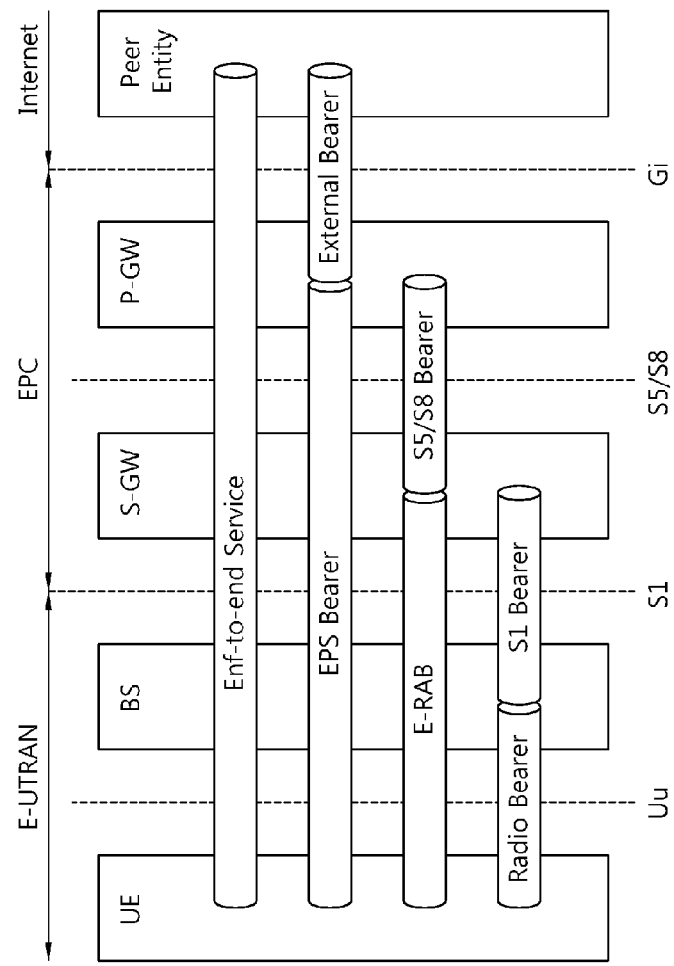
FIG. 4 shows a structure of a bearer service in 3rd generation partnership project (3GPP) long term evolution (LTE).

FIG. 4 shows a structure of a bearer service in 3GPP LTE. An RB is a bearer provided through a Uu interface to support a service of a user. By defining a bearer for each interface, the 3GPP LTE ensures independency between interfaces.

Bearers provided by a 3GPP LTE system are collectively referred to as an evolved packet system (EPS) bearer. For each interface, the EPS bearer is classified into a radio bearer (RB), an S1 bearer, and so on.

A packet gateway (P-GW) is a network node for connecting an LTE network and another network. The EPS bearer is defined between a UE and the P-GW. The EPS bearer is further divided between nodes, and thus an RB is defined between the UE and a BS, an S1 bearer is defined between the BS and an S-GW, and an S5/S8 bearer is defined between the P-GW and the S-GW in an EPC. Each bearer is defined by using a quality of service (QoS). The QoS is defined by using a data rate, an error rate, a delay, etc.

Therefore, a QoS to be provided generally in the LTE system is first defined by using the EPS bearer, and thereafter a QoS of each interface is defined. Each interface sets up a bearer according to a QoS to be provided by itself.

Regarding bears of respective interfaces, QoSs of all EPS bearers are provided by being divided for each interface. Therefore, the EPS bearer, the RB, the S1 bearer, and so on have a one-to-one relation.

A long-term evolution-advanced (LTE-A) system is an LTE system evolved to conform to an IMT-advanced requirement which is a 4th generation mobile communication requirement recommended by international telecommunication union-radio communication sector (ITU-R). An LTE-A system standard has actively been developed in recent years in 3GPP which developed the LTE system standard.

The LTE-A system employs new techniques such as carrier aggregation and a relay. The carrier aggregation is used to flexibly extend an available bandwidth. The relay is used to increase a cell coverage and support group mobility and to enable user-centered network deployment.

Figure 5:
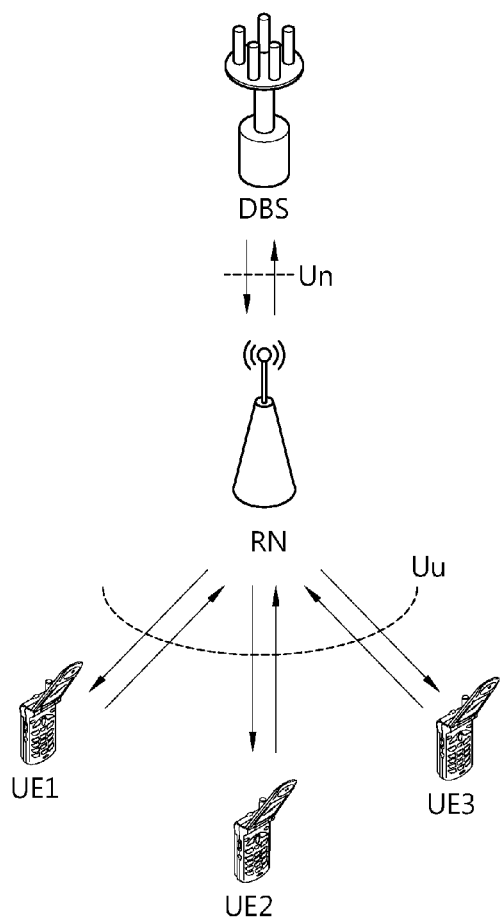
FIG. 5 shows a network system supporting a relay.

FIG. 5 shows a network system supporting a relay. The relay serves to relay data between a UE and a BS. A network node for performing a relay function is referred to as a relay node (RN). A BS for managing one or more RNs is referred to as a donor BS (DBS).

A radio interface between the UE and the RN is referred to as a Uu interface. A radio interface between the RN and the DBS is referred to as a Un interface. A link between the UE and the RN is referred to as an access link. A link between the RN and the DBS is referred to as a backhaul link.

The RN manages the UE on behalf of the DBS. The UE can receive a service transparently from the DBS via the RN. This implies that it is not necessary to know whether the UE receives the service from the DBS via the RN or whether the UE receives the service directly from the DBS. Therefore, the Uu interface between the UE and the RN can use a Uu interface protocol used by the 3GPP LTE almost without changes.

From the perspective of the DBS, the RN can receive a service as a UE and also can receive the service as a BS of the UE. For example, when the RN initially accesses the DBS, the DBS does not know whether the RN attempts to access. Therefore, the RN can attempt to access the DBS by performing a typical random access process similarly to other UEs. Once the RN has accessed the DBS, the RN operates as if it is a BS for managing a UE connected to the RN.

Accordingly, a Un interface protocol is necessarily defined in a format in which a function of a network protocol is added together with a function of the Uu interface protocol. Regarding the Un interface protocol, there is an ongoing discussion on which function is to be added or changed in each protocol layer in current 3GPP on the basis of the Uu interface protocol such as MAC/RLC/PDCP/RRC layers.

Figure 6:
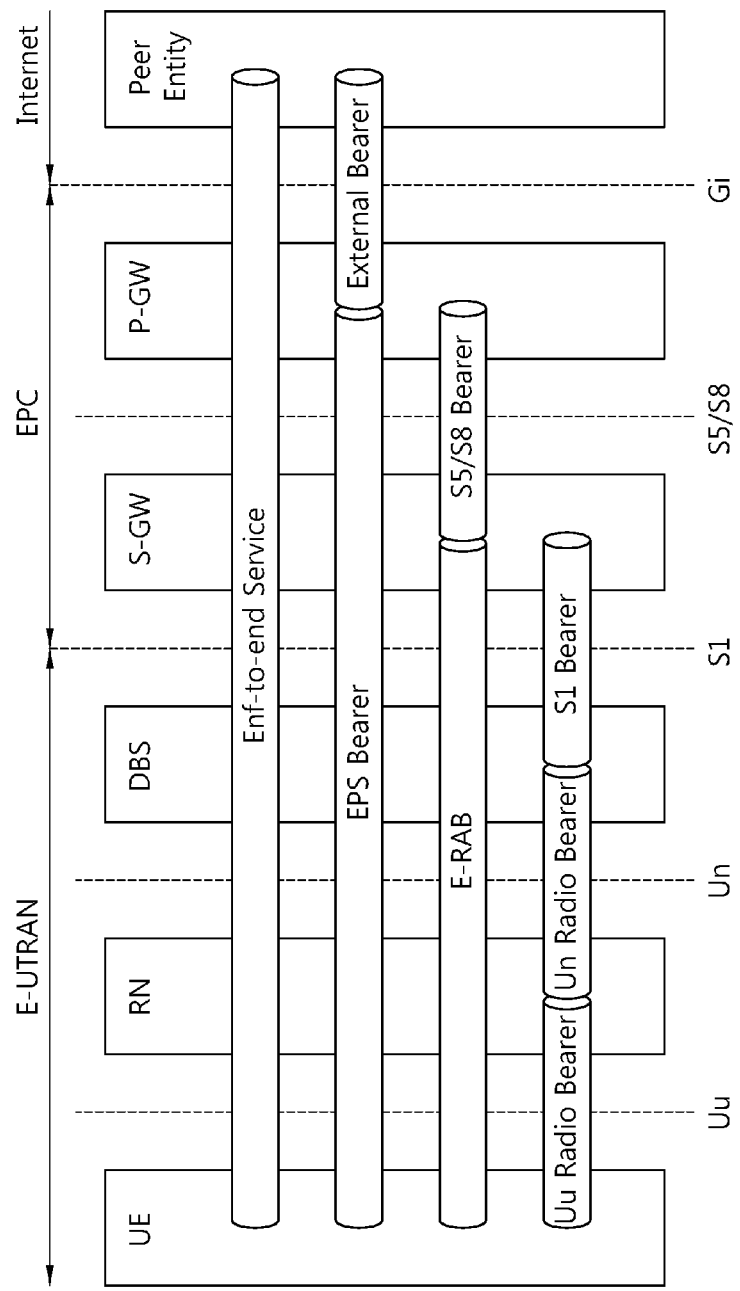
FIG. 6 shows an exemplary structure of a bearer service in a network system employing a relay.

FIG. 6 shows an exemplary structure of a bearer service in a network system employing a relay.

An EPS bearer is defined between a UE and a P-GW. More specifically, a Uu radio bearer (UuRB) is defined between the UE and an RN, a Un RB (UnRB) is defined between the RN and a DBS, and an S1 bearer is defined between the DBS and an S-GW. The UuRB can be defined to be identical to the existing RB between the UE and a BS.

Hereinafter, the UuRB denotes an RB which is set up in a Uu interface, and the UnRB denotes an RB which is set up in a Un interface.

Figure 7:
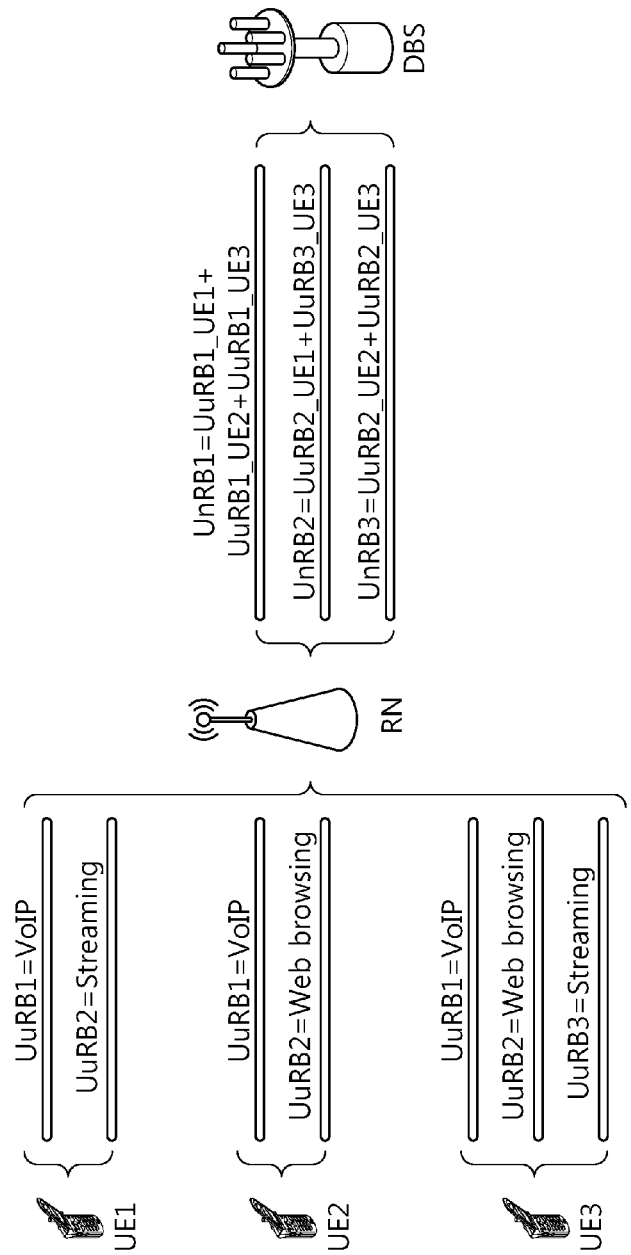
FIG. 7 shows an example of UuRB-UnRB mapping.

FIG. 7 shows an example of UuRB-UnRB mapping. In this case, a UnRB between an RN and a DBS is determined according to a QoS. A method of mapping UuRBs having identical or similar QoSs to a UnRB irrespective of a UE is referred to as per-QoS bearer mapping.

Since one UnRB ensures one QoS, a UuRB which is set up between the UE and the RN is mapped to a specific UnRB according to a QoS property irrespective of the UE. Among a plurality of UuRBs for a plurality of UEs, UuRBs having the same ensured QoS are mapped to the same UnRB, and UuRBs having different ensured QoSs are mapped to different UnRBs.

Several UuRBs are multiplexed and are transmitted using one UnRB, and thus a data packet transmitted through the UnRB may include a UE ID for identifying the UE and an RB ID for identifying an RB for one UE.

In the example of FIG. 7, a UuRB1_UE1, a UuRB1_UE2, and a UuRB1_UE3, each of which has a QoS for the same VoIP, are mapped to a UnRB1. A UuRB2_UE1 and a UuRB3_UE3, each of which has a QoS for streaming, are mapped to a UnRB2. A UuRB2_UE2 and a UuRB2_UE3, each of which has a QoS for web browsing, are mapped to a UnRB3. Each UnRB has a unique QoS supported by itself, and thus the number of UnRBs which are set up between the RN and the DBS is equal to the number of QoSs supported between the RN and the DBS.

When the number of UuRBs having the same QoS is great, radio resources may be insufficient to transmit data packets multiplexed using one UnRB. In this case, even UuRBs having the same QoS may be mapped to different UnRBs. On the other hand, if the radio resources are sufficient for one UnRB, one UnRB may support several similar QoSs. That is, UuRBs having similar QoSs are mapped to one UnRB.

Hereinafter, an RB may be a unidirectional RB supporting only an uplink or a downlink or may be a bidirectional RB supporting both the uplink and the downlink.

A UnRB is set up in a Un interface between an RN and a DBS to support a service for a UE connected to the RN. However, since the maximum number of UnRBs is limited, a QoS supported by the Un interface is also limited. Therefore, if a large number of UEs are connected to the RN, the RN may not be able to provide the RN with the QoS with respect to all services requested by the UEs.

According to the conventional method, when the UE requests a service with a QoS not supportable by the RN, it takes a long time to recognize that the service is not supported by the RN after the service is requested by the UE.

Figure 8:
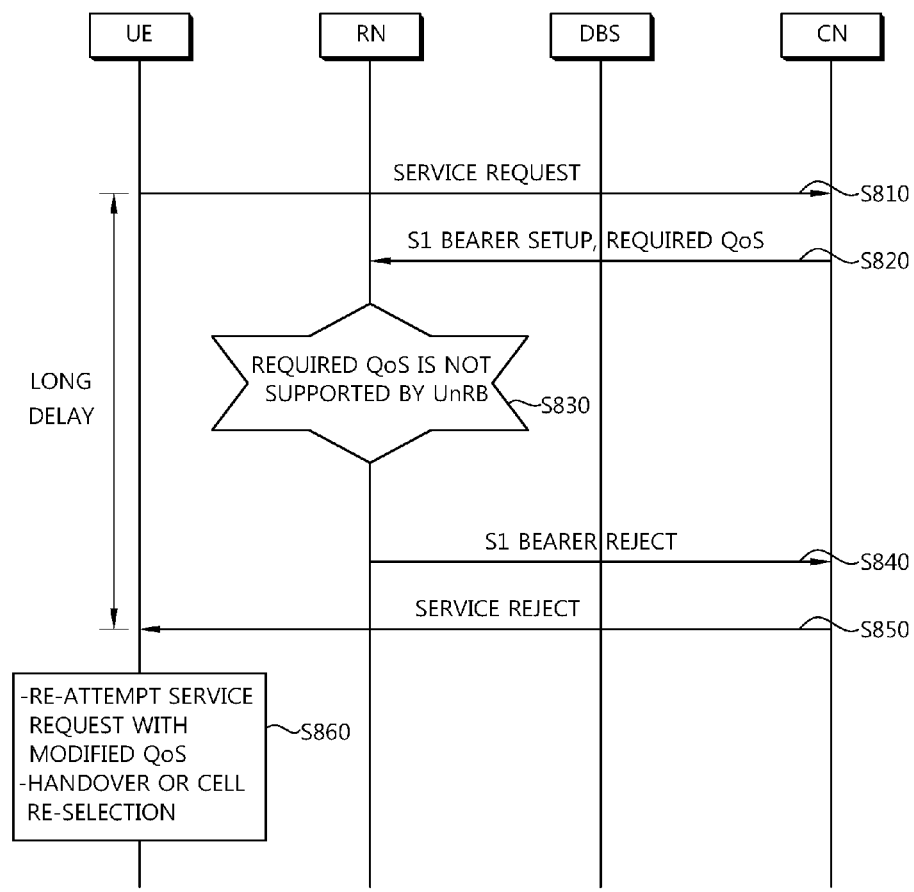
FIG. 8 is a flowchart showing a problem of the conventional method.

FIG. 8 is a flowchart showing a problem of the conventional method.

A UE transmits a service request to an RN, and the service request is delivered to a core network (CN) via a DBS (step S810). In response to the service request, the CN transmits an S1 bearer setup request and a required QoS to the RN (step S820). It is assumed herein that the required QoS requested by the CN is not supported by a UnRB (step S830).

Even if the UE connected to the RN requests the RN to provide a service, the RN cannot know which QoS is supported, and thus the UE directly requests a QoS required for a service desired by the UE. When the service request of the UE is delivered to the CN via the RN and the DBS, the CN does not know a QoS supported by the RN either. Therefore, in response to the service request, the S1 bearer setup is requested to the RN, and at the same time, it is requested to the RN to set up a UuRB and UnRB supporting the QoS of the service request.

When the QoS requested by the CN is not supported by the RN, the RN rejects the S1 bearer setup request of the CN (step S840). When the S1 bearer setup request is rejected, the CN transmits a service rejection message to the UE (step S850).

The UE may re-attempt the service request with a modified QoS or perform handover or cell re-selection to another cell (step S860).

Consequently, when the UE requests the service with the QoS not supported by the RN, many messages are exchanged among the UE, the CN, and the RN before recognizing that the service is not supported. Therefore, a time delay occurring in this case may be significantly long.

When the UE knows that the service requested by the UE is not supported by the RN, the UE re-transmits the service request by modifying the QoS or re-transmits the service request by accessing another cell. However, if the service request is continuously rejected, a great time delay may occur until the service of the UE starts.

To prevent the time delay caused by a continuous service request attempt of the UE and radio resource waste caused by unnecessary service request transmission, the present invention proposes to notify in advance the QoS supported by the RN to the UE.

Hereinafter, as one entity of an evolved packet core (EPC) for managing the RN, the CN may include at least any one of a mobility management entity (MME), an operations and management (OAM), and a serving gateway (S-GW).

Figure 9:
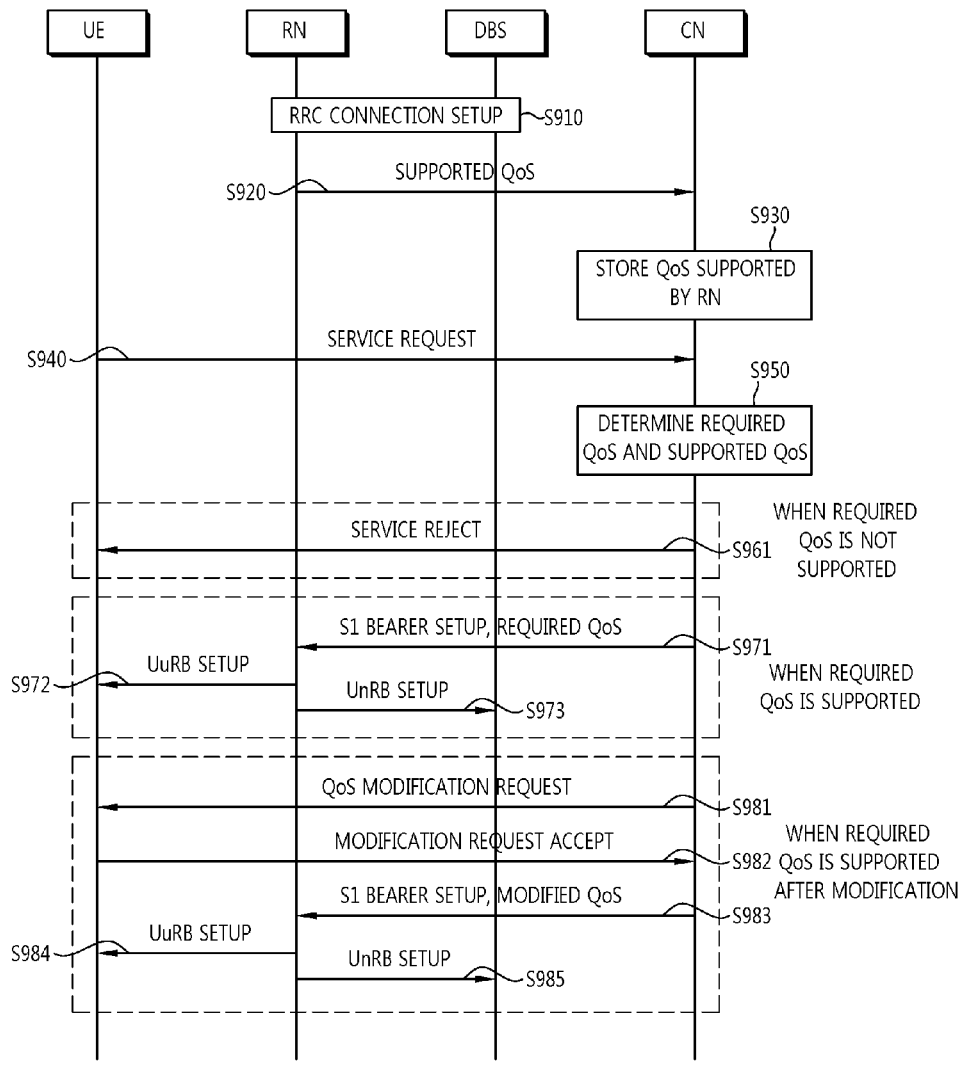
FIG. 9 is a flowchart showing a radio bearer (RB) setup method according to an embodiment of the present invention.

FIG. 9 is a flowchart showing an RB setup method according to an embodiment of the present invention. In this method, a QoS supported by an RN is announced to a CN, and the CN stores information on the QoS. Upon receiving a service request from a UE, the CN determines whether the QoS of the RN is supported, and then rejects or accepts the service request or modifies the QoS according to the determination result.

The RN initially accesses a DBS, and establishes an RRC connection setup (step S910).

The RN transmits information on a supported QoS to the CN (step S920). The information on the supported QoS consists of a list of several QoS elements. Each QoS element includes at least one of a bit rate, an error rate, and a delay. Further, each QoS element may be mapped to one UnRB.

The RN may not accept the access of the UE before the information on the supported QoS is transmitted to the CN.

Upon receiving the information on the supported QoS from the RN, the CN stores the QoS information (step S930).

To receive a specific service, the UE connected to the RN transmits a service request to the CN via the RN (step S940). The CN compares the supported QoS previously stored and a QoS required by the service requested by the UE, and thus determines whether the RN can support the required QoS (step S950).

If it is determined that the RN cannot support the required QoS of the service requested by the UE, the CN transmits a service reject message to the UE to indicate that the service is rejected (step S961). The UE determines that the service is not supported by the RN, and cancels the service request or attempts to access another RN or BS.

If it is determined that the RN supports the required QoS of the service requested by the UE, the CN sets up an S1 bearer with respect to the RN, and transmits information on the QoS required for the service to the RN (step S971). The RN sets up a UuRB with respect to the UE (step S972). Further, according to the required QoS, the RN sets up a UnRB with respect to the DBS (step S973). Therefore, all EPS bearers are set up completely.

When the RN does not support the required QoS of the service requested by the UE, if it is determined that the RN can support the required QoS after modification, the CN transmits a QoS modification message to the UE to request modification of the required QoS (step S981). The QoS modification message may include information on a QoS which is similar to the required QoS of the service and which can be supported by the RN.

If the UE accepts the QoS modification request of the CN, the UE transmits a modification accept message to the CN (step S982). The CN sets up an S1 bearer with respect to the RN, and transmits information on the modified QoS to the RN (step S983). The RN sets up a UuRB with respect to the UE (step S984). Further, according to the modified QoS, the RN sets up a UnRB with respect to the DBS (step S985). Therefore, all EPS bearers are set up completely.

If the UE cannot accept the QoS modification request of the CN, the UE transmits a modification reject message to the CN. The UE cancels the service request or attempts to access another RN or DBS.

Figure 10:
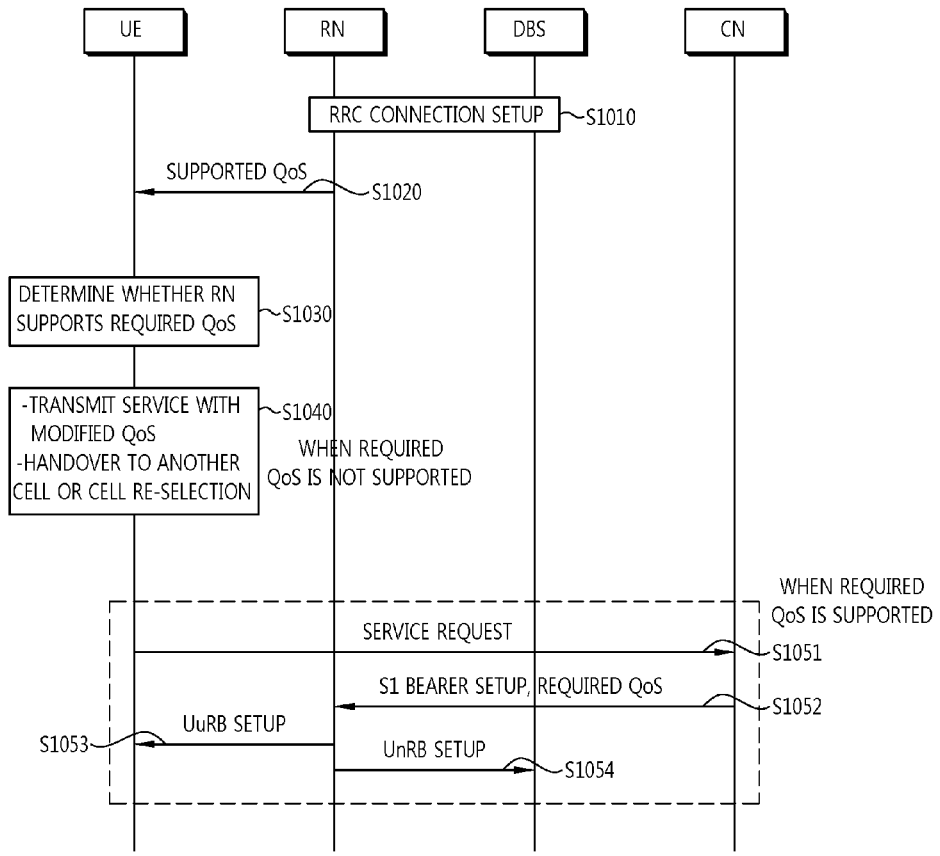
FIG. 10 is a flowchart showing an RB setup method according to another embodiment of the present invention.

FIG. 10 is a flowchart showing an RB setup method according to another embodiment of the present invention. In this method, a QoS supported by an RN is announced to a UE, and the UE determines whether the RN supports a QoS required by a service to be requested. If the RN supports the required QoS, the UE transmits a service request.

The RN initially accesses a DBS, and establishes an RRC connection setup (step S1010).

After establishing the RRC connection setup, the RN transmits information on the supported QoS to the UE (step S1020). The UE may store the QoS supported by the RN in a memory. The supported QoS may be transmitted by using a part of system information or RRC signaling. The information on the supported QoS consists of a list of several QoS elements. Each QoS element includes at least one of a bit rate, an error rate, and a delay. Further, each QoS element may be mapped to one UnRB. Each QoS element is identified by a QoS index. The information on the supported QoS may include an index of the supported QoS elements.

The RN may not accept the access of the UE before the information on the supported QoS is transmitted to the UE.

When the UE intends to transmit a service request for a service, the UE compares the supported QoS previously stored and a QoS required by the service requested by the UE, and thus determines whether the RN can support the required QoS (step S1030).

If it is determined that the RN does not support the required QoS requested by the service desired by the UE, the UE requests the service by modifying the QoS of the service into a QoS supported by the RN, or attempts to access another RN or another cell (step S1040). The UE may perform handover or cell re-selection.

If it is determined that the RN supports the QoS required by the service desired by the UE, the UE transmits a service request to a CN (step S1051). The CN sets up an S1 bearer with respect to the RN, and transmits information on the required QoS to the RN (step S1052). The RN sets up a UuRB with respect to the UE (step S1053). Further, according to the required QoS, the RN sets up a UnRB with respect to the DBS (step S1054). Therefore, all EPS bearers are set up completely.

By notifying in advance the QoS supported by the RN to the CN or the UE, a probability of rejecting the service of the UE can decrease, and a service delay can be minimized.

Figure 11:
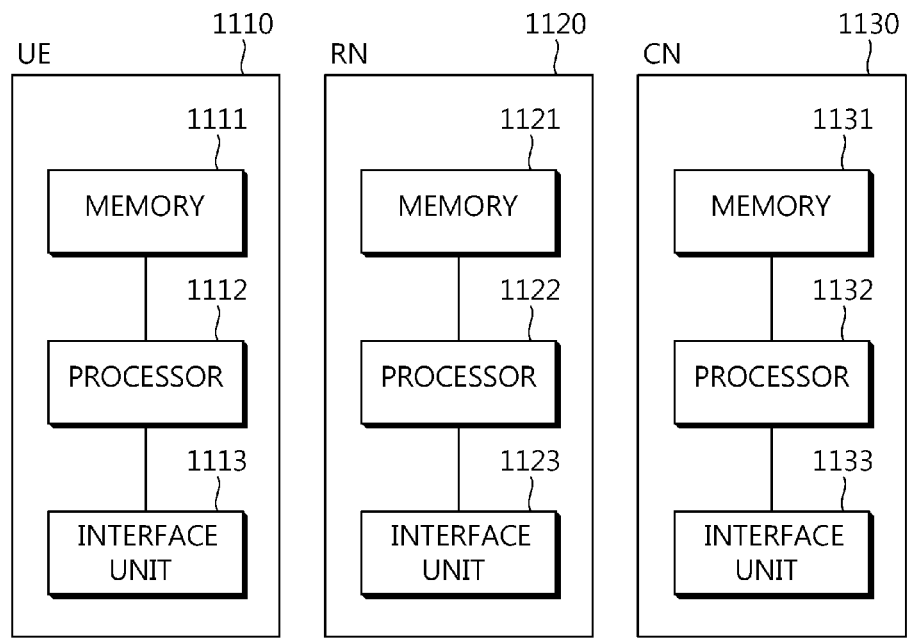
FIG. 11 is a block diagram showing a wireless communication system for implementing an embodiment of the present invention.

FIG. 11 is a block diagram showing a wireless communication system for implementing an embodiment of the present invention.

A UE 1110 includes a memory 1111, a processor 1112, and an interface unit 1113. The processor 1112 implements a radio interface protocol, and sets up a UuRB. The processor 1112 implements an operation of the UE in the aforementioned embodiment of FIG. 9 and FIG. 10. The memory 1111 is coupled to the processor 1112, and stores information for an operation of the processor 1112. The interface unit 1112 provides a radio interface with respect to an RN 1120, that is, a Uu interface.

The RN 1120 includes a memory 1121, a processor 1122, and an interface unit 1123. The processor 1122 implements a radio interface protocol, and sets up a UuRB and a UnRB. The processor 1122 implements an operation of the RN in the aforementioned embodiment of FIG. 9 and FIG. 10. The memory 1121 is coupled to the processor 1122, and stores information for an operation of the processor 1122. The interface unit 1122 provides a Uu interface between the UE and the RN and a Un interface between the RN and a BS.

A CN 1130 includes a memory 1131, a processor 1132, and an interface unit 1133. The processor 1132 implements a radio interface protocol, and implements an operation of the CN in the aforementioned embodiment of FIG. 9 and FIG. 10. The memory 1131 is coupled to the processor 1132, and stores information for an operation of the processor 1132. The interface unit 1132 provides an interface.

The processor may include application-specific integrated circuit (ASIC), other chipset, logic circuit and/or data processing device. When the embodiments are implemented in software, the techniques described herein can be implemented with modules (e.g., procedures, functions, and so on) that perform the functions described herein. The modules can be executed by the processor.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of setting up a radio bearer (RB) in a wireless communication system, the method comprising:
    transmitting, by a relay node, information related to quality of service (QoS) supported by the relay node to a core network (CN);
    relaying, by the relay node, a service request of a user equipment (UE) to the CN; and
    setting up a first RB over a first radio interface between the relay node and the UE for a service requested by the service request and setting up a second RB over a second radio interface between the relay node and a base station (BS) according to QoS required for the service if a first instruction is received from the CN and the first instruction indicates that the required QoS is supported by the relay node such that the UE is served by the base station via the first radio interface and the second radio interface,
    wherein:
    the UE modifies the QoS according to the QoS required for the service after receiving a QoS modification request from the CN if a second instruction, instead of the first instruction, is received from the CN, the second instruction indicating that the required QoS for the service is not supported by the relay node;
    the first RB is set up over the first radio interface between the relay node and the UE for the service and the second RB is set up over the second radio interface between the relay node and the base station according to the modified QoS such that the UE is served by the base station via the first radio interface and the second radio interface;
    the first RB is a UuRB and the first radio interface is a Uu interface; and
    the second RB is a UnRB and the second radio interface is a Un interface.

2. A method of setting up a radio bearer (RB) in a wireless communication system, the method comprising:
    receiving, by a core network (CN) from a relay node, information related to quality of service (QoS) supported by the relay node;
    receiving, by the CN, a service request from a user equipment (UE) via the relay node;
    determining, by the CN, whether the relay node supports QoS required for a service requested by the service request based on the information related to the supported QoS; and
    instructing the relay node to set up a first RB over a first radio interface between the relay node and the UE and to set up a second RB over a second radio interface between the relay node and a base station according to the required QoS if the relay node supports the required QoS such that the UE is served by the base station via the first radio interface and the second radio interface,
    wherein:
    the UE modifies the QoS according to the required QoS after receiving a QoS modification request from the CN if the relay node does not support the required QoS;
    the relay node is instructed to set up the first RB over the first radio interface between the relay node and the UE and the second RB over the second radio interface between the relay node and the base station according to the modified QoS such that the UE is served by the base station via the first radio interface and the second radio interface;
    the first RB is a UuRB and the first radio interface is a Uu interface; and
    the second RB is a UnRB and the second radio interface is a Un interface.

3. A device configured for setting up a radio bearer (RB) in a wireless communication system, the method comprising:
    a memory configured to store information;
    a processor operably coupled with the memory and configured to:
        transmit information related to quality of service (QoS) supported by a relay node to a core network (CN);
        relay a service request of a user equipment (UE) to the CN; and
        setup a first RB over a first radio interface between the relay node and the UE for a service requested by the service request and setup a second RB over a second radio interface between the relay node and a base station according to QoS required for the service if a first instruction is received from the CN such that the UE is served by the base station via the first radio interface and the second radio interface, the first instruction indicating that the required QoS is supported by the relay node, wherein:

the UE modifies the QoS according to the required QoS after receiving a QoS modification request from the CN if a second instruction, instead of the first instruction, is received from the CN, the second instruction indicating that the required QoS is not supported by the relay node;

the first RB is set up over the first radio interface between the relay node and the UE for the service and the second RB is set up over the second radio interface between the relay node and the base station according to the modified QoS such that the UE is served by the base station via the first radio interface and the second radio interface;

the first RB is a UuRB and the first radio interface is a Uu interface; and the second RB is a UnRB and the second radio interface is a Un interface.

* * * * *